United States Patent
Lu et al.

(10) Patent No.: US 12,413,330 B2
(45) Date of Patent: Sep. 9, 2025

(54) ANTI-JAMMING PROCESSING ARCHITECTURE BASED ON DUAL-COMPONENT FUSION APPLICATION OF SATELLITE NAVIGATION SIGNAL

(71) Applicant: NATIONAL UNIVERSITY OF DEFENSE TECHNOLOGY, Changsha (CN)

(72) Inventors: Zukun Lu, Changsha (CN); Jie Song, Changsha (CN); Zhibin Xiao, Changsha (CN); Feiqiang Chen, Changsha (CN); Baiyu Li, Changsha (CN); Long Huang, Changsha (CN); Zhihao Xue, Changsha (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 0 days.

(21) Appl. No.: 18/973,147

(22) Filed: Dec. 9, 2024

(65) Prior Publication Data

US 2025/0211361 A1 Jun. 26, 2025

(30) Foreign Application Priority Data

Dec. 26, 2023 (CN) .......................... 202311808085.1

(51) Int. Cl.
*H04K 3/00* (2006.01)
(52) U.S. Cl.
CPC ............... *H04K 3/90* (2013.01); *H04K 3/224* (2013.01)
(58) Field of Classification Search
CPC .................................. H04K 3/90; H04K 3/224
(Continued)

(56) References Cited

U.S. PATENT DOCUMENTS 6,154,443 A * 11/2000 Huang ................. H04B 1/7115
375/E1.032
6,205,400 B1 * 3/2001 Lin .......................... G01S 19/49
701/472
(Continued)

FOREIGN PATENT DOCUMENTS

CN 108649977 A 10/2018
CN 109490919 A 3/2019
(Continued)

OTHER PUBLICATIONS

Cheng Yanfei, et al., A Precision Correction Method for Space-time Anti-jamming Receivers, Journal of Telemetry, Tracking and Command, 2016, pp. 23-38, vol. 37, No. 3.
(Continued)

*Primary Examiner* — Nuzhat Pervin
(74) *Attorney, Agent, or Firm* — Bayramoglu Law Offices LLC

(57) ABSTRACT

The provided is an anti-jamming processing architecture based on a dual-component fusion application of a satellite navigation signal. The anti-jamming processing architecture includes: a receiver matched reception module, configured to receive a satellite navigation signal and separate the satellite navigation signal into a pilot component and a data component; a data channel anti-jamming module, configured to design a filtering weight vector recursive formula and perform anti-jamming on the received data component based on an updated filtering weight vector; a pilot channel anti-jamming module, configured to design a filter weight update formula and perform anti-jamming on the received pilot component based on an updated filter weight; and a data fusion application module, configured to perform message solving and pseudocode ranging respectively based on an anti-jamming data component and pilot component, fuse (Continued)

a pseudocode ranging result and solved message information, and provide a fusion result for a user.

9 Claims, 3 Drawing Sheets

(58) Field of Classification Search
USPC .......................................................... 342/14
See application file for complete search history.

(56) References Cited

U.S. PATENT DOCUMENTS

| | | | | |
|---|---|---|---|---|
| 6,961,017 | B1* | 11/2005 | Naylor | H04K 3/90 |
| | | | | 342/357.29 |
| 6,999,027 | B1* | 2/2006 | Stockmaster | H04K 3/228 |
| | | | | 342/357.29 |
| 7,298,289 | B1* | 11/2007 | Hoffberg | G08G 1/127 |
| | | | | 340/995.13 |
| 7,626,542 | B2* | 12/2009 | Kober | H04B 1/1027 |
| | | | | 342/357.29 |
| 8,373,582 | B2* | 2/2013 | Hoffberg | G08G 1/166 |
| | | | | 340/995.13 |
| 8,682,726 | B2* | 3/2014 | Hoffberg | G06Q 50/01 |
| | | | | 340/995.13 |
| 9,551,582 | B2* | 1/2017 | Hoffberg | G01C 21/3691 |
| 9,651,670 | B2* | 5/2017 | Kim | G01S 19/015 |
| 10,177,873 | B1* | 1/2019 | Zeng | H04B 1/0057 |
| 10,983,221 | B2* | 4/2021 | Agee | G01S 19/215 |
| 10,996,339 | B2* | 5/2021 | Agee | G01S 19/215 |
| 11,670,848 | B2* | 6/2023 | Kwon | H04B 7/0845 |
| | | | | 342/378 |
| 11,892,937 | B2* | 2/2024 | Ratnakaram | G06F 9/455 |
| 12,061,277 | B1* | 8/2024 | Fang | G01S 5/0264 |
| 2002/0116126 | A1* | 8/2002 | Lin | G01S 19/47 |
| | | | | 342/357.31 |
| 2005/0114023 | A1* | 5/2005 | Williamson | G01S 19/23 |
| | | | | 701/472 |
| 2009/0103720 | A1* | 4/2009 | Karayil Thekkoott Narayanan | H04B 7/10 |
| | | | | 380/34 |
| 2009/0141775 | A1* | 6/2009 | Kober | H04B 1/1027 |
| | | | | 342/194 |
| 2010/0283658 | A1* | 11/2010 | Kasperkovitz | H04K 3/42 |
| | | | | 342/16 |
| 2012/0306695 | A1* | 12/2012 | Kim | G01S 19/015 |
| | | | | 342/357.59 |
| 2013/0165070 | A1* | 6/2013 | Hoffberg | G08G 1/166 |
| | | | | 455/456.3 |
| 2013/0166387 | A1* | 6/2013 | Hoffberg | G08G 1/093 |
| | | | | 705/14.63 |
| 2013/0328711 | A1* | 12/2013 | Fenton | H01Q 17/008 |
| | | | | 342/16 |
| 2014/0035783 | A1* | 2/2014 | Contarino | G01S 19/215 |
| | | | | 342/357.59 |
| 2014/0125520 | A1* | 5/2014 | Fenton | H04K 3/90 |
| | | | | 342/357.59 |
| 2014/0375500 | A1* | 12/2014 | Wang | G01S 19/21 |
| | | | | 342/357.59 |
| 2016/0011318 | A1* | 1/2016 | Cohen | G01S 19/05 |
| | | | | 342/357.68 |
| 2016/0025500 | A1* | 1/2016 | Hoffberg | H04W 4/024 |
| | | | | 701/423 |
| 2017/0214486 | A1* | 7/2017 | Choi | H04K 3/65 |
| 2020/0292711 | A1* | 9/2020 | Martin | H04K 3/228 |
| 2020/0400837 | A1* | 12/2020 | Agee | G01S 19/215 |

FOREIGN PATENT DOCUMENTS

| | | | | |
|---|---|---|---|---|
| CN | 111694023 | A | | 9/2020 |
| CN | 115102607 | A | | 9/2022 |
| CN | 115657086 | A | | 1/2023 |
| CN | 117040564 | A | | 11/2023 |
| CN | 117270002 | A | | 12/2023 |
| JP | 3004638 | B1 | | 1/2000 |
| KR | 20250003216 | A | * | 1/2025 ......... H04L 27/2053 |
| WO | 2023001958 | A1 | | 1/2023 |

OTHER PUBLICATIONS

Xie Weihua, et al., Design and analysis of modernization GNSS navigation mesage encoding solution, Journal of Navigation and Positioning, 2016, pp. 10-14+20, vol. 4, No. 2.

Shabnam Sodagari, et al., Efficient Jamming Attacks on MIMO Channels, IEEE, 2012, pp. 852-856.

* cited by examiner

ANTI-JAMMING PROCESSING ARCHITECTURE BASED ON DUAL-COMPONENT FUSION APPLICATION OF SATELLITE NAVIGATION SIGNAL

CROSS-REFERENCE TO THE RELATED APPLICATIONS

This application is based upon and claims priority to Chinese Patent Application No. 202311808085.1, filed on Dec. 26, 2023, the entire contents of which are incorporated herein by reference.

TECHNICAL FIELD

The present disclosure relates to the technical field of anti-jamming for navigation signal receivers, and in particular to an anti-jamming processing architecture based on a dual-component fusion application of a satellite navigation signal.

BACKGROUND

Among the payloads of the Beidou satellite, the upload receiver receives radio frequency (RF) signals from ground stations. Unintentional jamming in the complex electromagnetic environment of space seriously affects the reception, amplification, frequency conversion, and demodulation of ground uplink signals. Time-domain anti-jamming is widely used in spaceborne receivers due to its simple implementation, and it can effectively suppress unintentional jamming from electromagnetic space. The main problems in spaceborne time-domain anti-jamming are insufficient jamming suppression capability and the introduction of ranging deviation, which seriously affect the ranging and solving of the upload receiver.

The current research on anti-jamming performance and measurement calibration is usually independent of each other. The navigation receiver performs message demodulation and ranging processing only on the data component, resulting in the waste of the pilot component. High-precision time-domain anti-jamming algorithms avoid peak distortion by sacrificing convergence performance, but the high-performance anti-jamming usually does not consider the impact of time-domain anti-jamming on measurement accuracy. Therefore, existing algorithms cannot avoid the contradiction between anti-jamming performance and ranging accuracy.

SUMMARY

In response to the aforementioned technical problems, the present disclosure provides an anti-jamming processing architecture based on a dual-component fusion application of a satellite navigation signal. The present disclosure balances anti-jamming performance and ranging accuracy.

The anti-jamming processing architecture based on a dual-component fusion application of a satellite navigation signal includes a receiver matched reception module, a data channel anti-jamming module, a pilot channel anti-jamming module, and a data fusion application module, where the receiver matched reception module is configured to receive a satellite navigation signal, separate the satellite navigation signal into a pilot component and a data component, and perform weighted summation on the pilot component and the data component to achieve matched reception of the signal;

the data channel anti-jamming module is configured to filter the received data component based on a filtering weight vector to obtain a time-domain anti-jamming data component, design a filtering weight vector recursive formula based on the received data component and the time-domain anti-jamming data component, continuously update the filtering weight vector of a next batch of data component according to the filtering weight vector recursive formula, and perform anti-jamming on the received data component based on the updated filtering weight vector to obtain an anti-jamming data component;

the pilot channel anti-jamming module is configured to perform batch filtering on the received pilot component based on a filter, design a filter weight update formula based on the received pilot component and the time-domain anti-jamming pilot component, and continuously update a filter weight of a next batch of data based on the filter weight update formula, and perform anti-jamming on the received pilot component based on the updated filter weight to obtain an anti-jamming pilot component, where the filter weight is updated once for each batch of data received; and the data fusion application module is configured to receive the anti-jamming data component and the anti-jamming pilot component, perform message solving and pseudocode ranging respectively based on the anti-jamming data component and the anti-jamming pilot component, fuse a pseudocode ranging result and solved message information, and provide a fusion result for a user.

In an embodiment, the receiver matched reception module is further configured to design a frequency of a matched filter for implementing the matched reception of the signal:

$$h(t) \overset{FFT}{\leftrightarrow} H(\omega) = kS^*(\omega)e^{-j\omega t_0};$$

where, $h(t)$ denotes an impulse response of the matched filter; $H(\omega)$ denotes a frequency response function of the matched filter; $k$ denotes a transfer coefficient; $S(\omega)$ denotes a frequency spectrum of a certain component signal; $t_0$ denotes a sampling time; and *, a superscript, denotes conjugation taking.

In an embodiment, the data channel anti-jamming module is configured to filter the received data component based on the filtering weight vector to obtain the time-domain anti-jamming data component:

$$y_{data}(n) = x_{data} \cdot W = \sum_{k=1}^{N} x_{data}(n-k+1) w_k^l;$$

where, $x_{data}$ denotes the received data component; $W$ denotes the filtering weight vector; $N$ denotes a length of an anti-jamming filter; $n$ denotes data at time $n$; $k$ denotes a filter coefficient number; $w_k^l$ denotes a k-th filter coefficient for an l-th iteration; and $l$ denotes a weight vector iteration number of the anti-jamming filter.

In an embodiment, the received data component is:

$$x_{data} = [x_{data}(n), x_{data}(n-1), \ldots, x_{data}(n-N+1)]^T;$$

where, T, a superscript, denotes a transpose operation.
In an embodiment, the filtering weight vector is:

$$W^l = [w_1^l, w_2^l, \ldots, w_N^l].$$

In an embodiment, the data channel anti-jamming module is further configured to design the filtering weight vector recursive formula based on the received data component and the time-domain anti-jamming data component:

$$W^l = W^{l-1} - \frac{\alpha}{\|x_{data}(n)\|^2 + \beta} e^*(n) x_{data}(n)$$

$$= W^{l-1} - \frac{\alpha}{\|x_{data}(n)\|^2 + \beta} [s_{data}(n) - y_{data}(n)]^* x_{data}(n);$$

$$= W^{l-1} - \frac{\alpha}{\|x_{data}(n)\|^2 + \beta} y_{data}^*(n) x_{data}(n)$$

where, α and β denote step size control parameters; e(n) denotes an error signal; $s_{data}(n)$ denotes the navigation signal; $y_{data}(n)$ denotes the time-domain anti-jamming data component; and $\|\ \|^2$ denotes an l2 norm.

In an embodiment, the received pilot component is:

$$x_{pilot}(n) = [x_{pilot}(n), x_{pilot}(n-1), \ldots, x_{pilot}(n-N+1)]^T;$$

where, N denotes a length of an anti-jamming filter; n denotes data at time n; and T, a superscript, denotes a transpose operation.

In an embodiment, the pilot channel anti-jamming module is further configured to filter the received pilot component based on a filter weight to obtain a time-domain anti-jamming pilot component:

$$y_{pilot}(3k+i) = W^H(k) x_{pilot}(3k+i), \quad i = 0, 1, 2;$$

where, k denotes a length number of a filter; $(\cdot)^H$ denotes conjugate transpose; and $x_{pilot}$ denotes the received pilot component.

In an embodiment, the pilot channel anti-jamming module is configured to design a filter weight update formula based on the received pilot component and the time-domain anti-jamming pilot component:

$$W(k) = W(k-1) + \frac{2\mu}{3} \sum_{i=0}^{2} y_{pilot}^*(3(k-1)+i) x_{pilot}(3(k-1)+i);$$

where, μ denotes an anti-jamming convergence step size; and *, a superscript, denotes conjugation taking.

In the above anti-jamming processing architecture based on a dual-component fusion application of a satellite navigation signal, firstly, the receiver matched reception module separates the navigation signal to obtain a data component and a pilot component. Based on the data component and the pilot component, the data channel anti-jamming module and the pilot channel anti-jamming module are designed separately to perform high-performance anti-jamming and high-precision anti-jamming on the data component and the pilot component, respectively. The accuracy of message demodulation in the data component is improved through high-performance anti-jamming, and high-precision ranging is achieved in the pilot component through high-precision anti-jamming. Then, the data fusion application module is designed to perform message solving and pseudocode ranging based on the received anti-jamming data component and pilot component, respectively. The pseudocode ranging result and the solved message information are fused and provided to the user. Compared with the existing anti-jamming architecture of Beidou satellite navigation receivers, the present disclosure fully utilizes the dual-component characteristic of the navigation signal, improving the ranging effect of the pilot component and the demodulation accuracy of the data component. The present disclosure achieves anti-jamming performance within 3 dB·Hz and maintains measurement deviation within 0.3 ns, solving the problem of the traditional architecture that is unable to achieve both demodulation and measurement requirements.

DETAILED DESCRIPTION OF THE EMBODIMENTS

To make the objectives, technical solutions, and advantages of the present disclosure clearer, the present disclosure is further described in detail below with reference to the drawings and embodiments. It should be understood that the specific embodiments described herein are merely used to explain the present disclosure, rather than to limit the present disclosure.

An embodiment provides an anti-jamming processing architecture based on a dual-component fusion application of a satellite navigation signal, including a receiver matched reception module, a data channel anti-jamming module, a pilot channel anti-jamming module, and a data fusion application module.

The receiver matched reception module is configured to receive a satellite navigation signal, separate the satellite navigation signal into a pilot component and a data component, and perform weighted summation on the pilot component and the data component to achieve matched reception of the signal.

The data channel anti-jamming module is configured to filter the received data component based on a filtering weight vector to obtain a time-domain anti-jamming data component, design a filtering weight vector recursive formula based on the received data component and the time-domain anti-jamming data component, continuously update the filtering weight vector of a next batch of data component according to the filtering weight vector recursive formula, and perform anti-jamming on the received data component based on the updated filtering weight vector to obtain an anti-jamming data component.

The pilot channel anti-jamming module is configured to perform batch filtering on the received pilot component based on a filter, design a filter weight update formula based on the received pilot component and the time-domain anti-jamming pilot component, and continuously update a filter weight of a next batch of data based on the filter weight update formula, and perform anti-jamming on the received pilot component based on the updated filter weight to obtain an anti-jamming pilot component, where the filter weight is updated once for each batch of data received.

The data fusion application module is configured to receive the anti-jamming data component and the anti-jamming pilot component, perform message solving and pseudocode ranging respectively based on the anti-jamming data component and the anti-jamming pilot component, fuse a pseudocode ranging result and solved message information, and provide a fusion result for a user.

Figure 1:
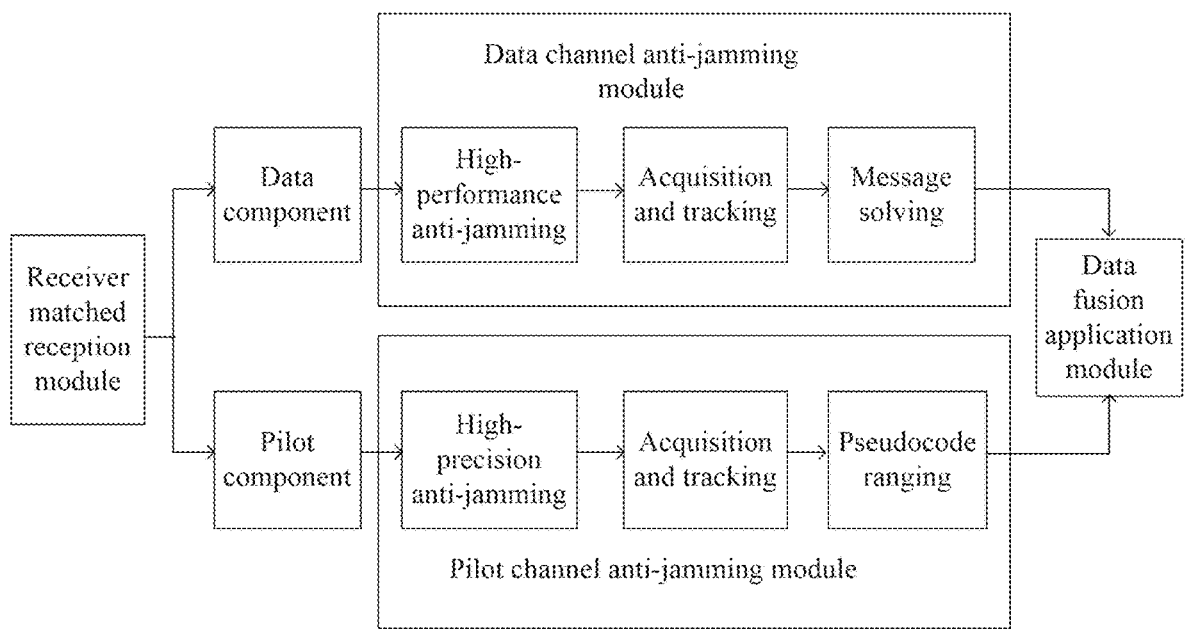
FIG. 1 is a schematic diagram of an anti-jamming processing architecture based on a dual-component fusion application of a satellite navigation signal according to an embodiment.

In the above anti-jamming processing architecture based on a dual-component fusion application of a satellite navigation signal, as shown in FIG. 1, firstly, the receiver matched reception module separates the navigation signal to obtain the data component and the pilot component. Based on the data component and the pilot component, dual-channel components are established to achieve anti-jamming. The data channel anti-jamming module is designed to perform high-performance anti-jamming on the data component. That is, the filtering weight vector recursive formula is designed to continuously update the filtering weight vector, in order to achieve high accuracy of the message signal. The data component improves the accuracy of message demodulation through high-performance anti-jamming. The pilot channel anti-jamming module is designed to perform high-precision anti-jamming on the pilot component. That is, the filter weight update formula is designed to continuously update the filter weight, achieving the goal of high-precision measurement of pseudorange and code phase. The pilot component achieves high-precision ranging through high-precision anti-jamming. Then, the data fusion application module is designed to perform message solving and pseudocode ranging based on the received anti-jamming data component and pilot component, respectively. The pseudocode ranging result and the solved message information are fused and provided to the user. The terminal integrates dual-channel ranging and message information to achieve high-precision positioning and high-performance solving. Compared with the existing anti-jamming architecture of Beidou satellite navigation receivers, the present disclosure fully utilizes the dual-component characteristic of the navigation signal, improving the ranging effect of the pilot component and the demodulation accuracy of the data component. The present disclosure achieves anti-jamming performance within 3 dB·Hz and maintains measurement deviation within 0.3 ns, solving the problem of the traditional architecture that is unable to achieve both demodulation and measurement requirements.

In an embodiment, the receiver matched reception module is further configured to design a frequency of a matched filter for implementing the matched reception of the signal:

$$h(t) \overset{FFT}{\leftrightarrow} H(\omega) = kS^*(\omega)e^{-j\omega t_0};$$

where, h(t) denotes an impulse response of the matched filter; H(ω) denotes a frequency response function of the matched filter; k denotes a transfer coefficient; S(ω) denotes a frequency spectrum of a certain component signal; $t_0$ denotes a sampling time; and *, a superscript, denotes conjugation taking.

In a specific embodiment, the navigation receiver performs weighted summation on different components of the navigation signal to maximize the output signal-to-noise ratio at a sampling and decision time of $t=t_0$, thereby achieving matched reception. The frequency response of the matched filter satisfies $$h(t) \overset{FFT}{\leftrightarrow} H(\omega) = kS^*(\omega)e^{-j\omega t_0}.$$

In an embodiment, the data channel anti-jamming module is configured to filter the received data component based on the filtering weight vector to obtain the time-domain anti-jamming data component:

$$y_{data}(n) = x_{data} \cdot W = \sum_{k=1}^{N} x_{data}(n-k+1)w_k^l;$$

where, $x_{data}$ denotes the received data component; W denotes the filtering weight vector; N denotes a length of an anti-jamming filter; n denotes data at time n; k denotes a filter coefficient number; $w_k^l$ denotes a k-th filter coefficient for an l-th iteration; and l denotes a weight vector iteration number of the anti-jamming filter.

In an embodiment, the received data component is:

$$x_{data} = [x_{data}(n), x_{data}(n-1), \ldots, x_{data}(n-N+1)]^T;$$

where, T, a superscript, denotes a transpose operation.
In an embodiment, the filtering weight vector is:

$$W^l = [w_1^l, w_2^l, \ldots, w_N^l].$$

In an embodiment, the data channel anti-jamming module is further configured to design the filtering weight vector recursive formula based on the received data component and the time-domain anti-jamming data component:

$$\begin{aligned} W^l &= W^{l-1} - \frac{\alpha}{\|x_{data}(n)\|^2 + \beta} e^*(n) x_{data}(n) \\ &= W^{l-1} - \frac{\alpha}{\|x_{data}(n)\|^2 + \beta} [s_{data}(n) - y_{data}(n)]^* x_{data}(n) \\ &= W^{l-1} + \frac{\alpha}{\|x_{data}(n)\|^2 + \beta} y_{data}^*(n) x_{data}(n) \end{aligned}$$

where, α and β denote step size control parameters; e(n) denotes an error signal; $s_{data}(n)$ denotes the navigation signal; $y_{data}(n)$ denotes the time-domain anti-jamming data component; and $\| \|^2$ denotes an l2 norm.

In a specific embodiment, the data channel includes a navigation message, which is the only navigation signal component that can achieve message demodulation. Therefore, high-performance anti-jamming is applied to the data channel. The filtering weight vector recursive formula is designed to continuously update the filtering weight vector and achieve high accuracy of the message signal.

In an embodiment, the received pilot component is:

$$x_{pilot}(n) = [x_{pilot}(n), x_{pilot}(n-1), \ldots, x_{pilot}(n-N+1)]^T;$$

where, N denotes a length of an anti-jamming filter; n denotes data at time n; and T, a superscript, denotes a transpose operation.

In an embodiment, the pilot channel anti-jamming module is further configured to filter the received pilot component based on a filter weight to obtain a time-domain anti-jamming pilot component:

$$y_{pilot}(3k+i) = W^H(k)x_{pilot}(3k+i), i = 0,1,2;$$

where, k denotes a length number of a filter; $(\cdot)^H$ denotes conjugate transpose; and $x_{pilot}$ denotes the received pilot component.

In an embodiment, the pilot channel anti-jamming module is configured to design a filter weight update formula based on the received pilot component and the time-domain anti-jamming pilot component:

$$W(k) = W(k-1) + \frac{2\mu}{3}\sum_{i=0}^{2} y^*_{pilot}(3(k-1)+i)x_{pilot}(3(k-1)+i);$$

where, μ denotes an anti-jamming convergence step size; and *, a superscript, denotes conjugation taking.

In a specific embodiment, the pilot channel only includes a ranging code. Therefore, there is no need to focus on anti-jamming performance, but rather on high-precision anti-jamming of the pilot channel. The filter weight update formula is designed to continuously update the filter weight, achieving high-precision measurement of pseudorange and code phase.

Figure 2:
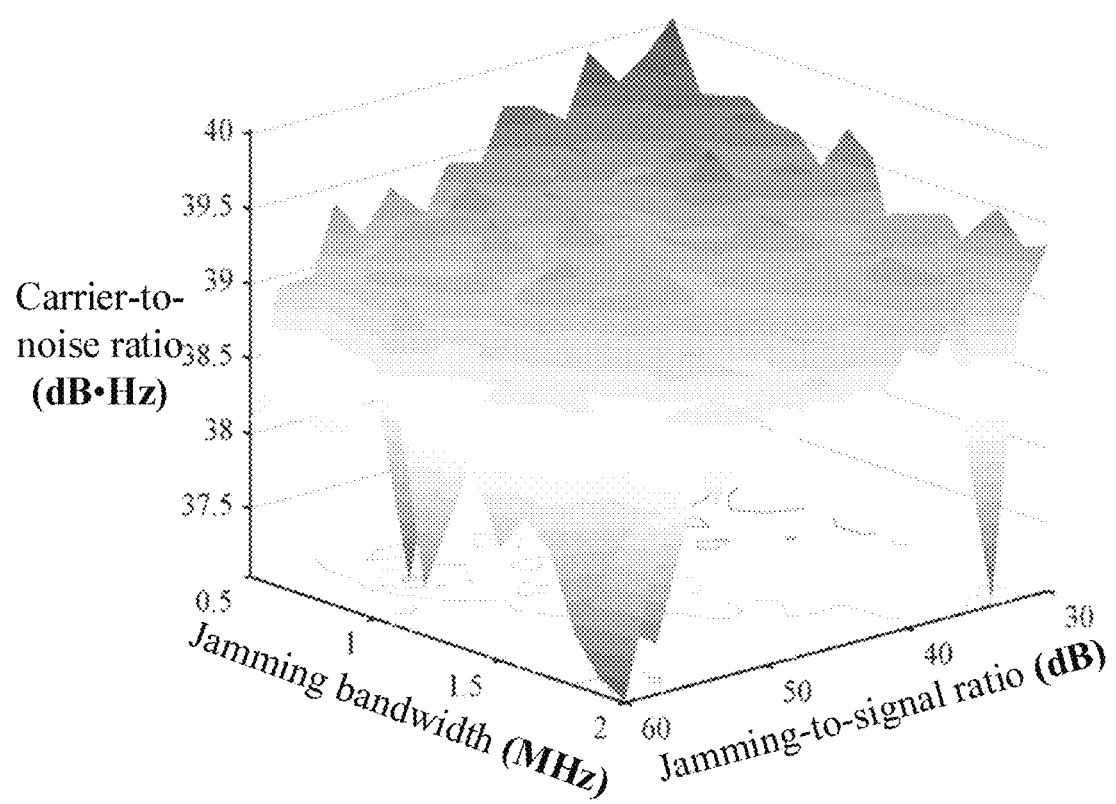
FIG. 2 is a schematic diagram of an anti-jamming effect in a data channel according to an embodiment.

The present disclosure further conducted a simulation experiment based on the following parameters: simulation data carrier-to-noise ratio of 40 dB·Hz, jamming bandwidth of 0.5-2 MHZ, and signal-to-noise ratio of 30-60 dB. As shown in FIG. 2, the experimental results indicate that high-performance anti-jamming is achieved for the data channel, with a maximum carrier-to-noise ratio loss of approximately 3 dB·Hz, achieving high-performance anti-jamming for the data component.

Figure 3:
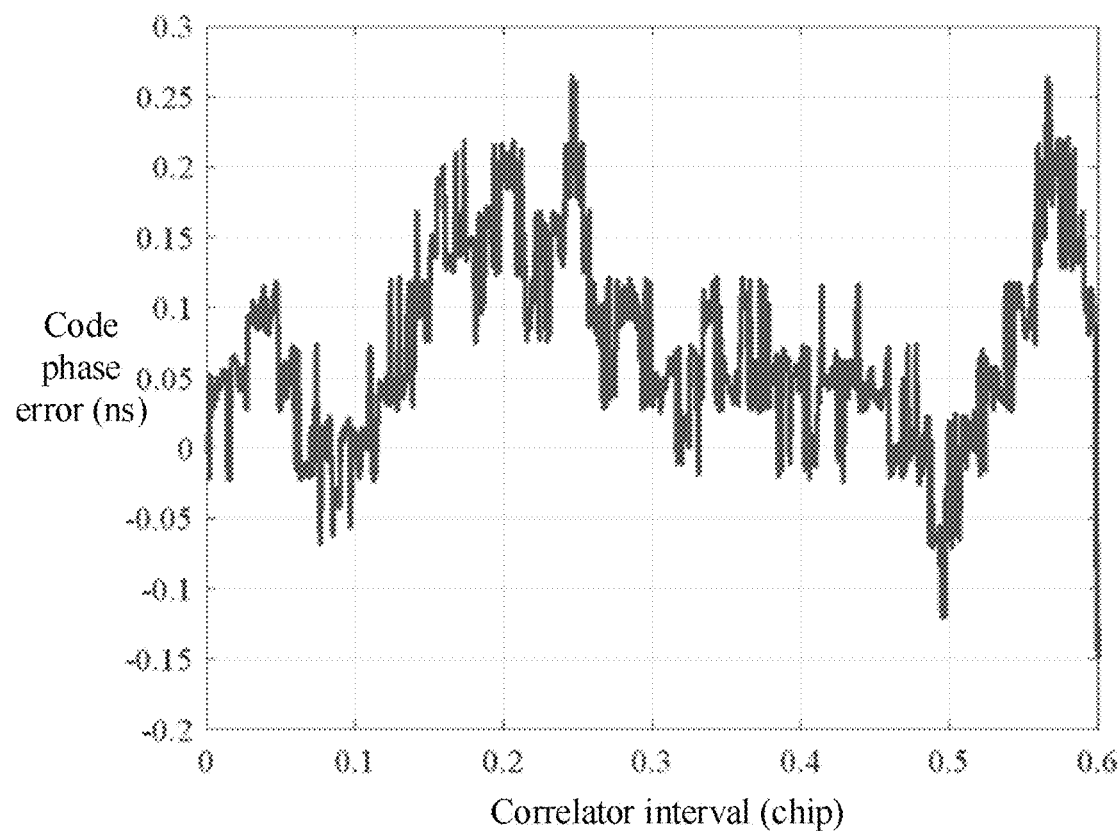
FIG. 3 is a schematic diagram of an anti-jamming effect in a pilot channel according to an embodiment.

An S-curve deviation of the anti-jamming output result is plotted, which represents the ranging deviation. As shown in FIG. 3, the experimental results indicate that high-precision anti-jamming is achieved for the pilot channel. The measurement deviation of the pilot channel data always remains within 0.5 ns, and most of it remains within 0.3 ns, achieving high-precision anti-jamming of the pilot component.

The technical characteristics of the above embodiments can be employed in arbitrary combinations. To provide a concise description of these embodiments, all possible combinations of all the technical characteristics of the above embodiments may not be described; however, these combinations of the technical characteristics should be construed as falling within the scope defined by the specification as long as no contradiction occurs.

The above embodiments only represent some implementations of the present disclosure, and the description thereof is more specific and detailed, but cannot be construed as a limitation on the scope of the present disclosure. It should be noted that, for a person of ordinary skill in the art, several variations and improvements can be made without departing from the concept of the present disclosure, all of which fall within the protection scope of the present disclosure. Therefore, the protection scope of present disclosure shall be subject to the appended claims.

What is claimed is:

1. An anti-jamming method based on a dual-component fusion application of a satellite navigation signal, comprising:

receiving the satellite navigation signal, separating the satellite navigation signal into a pilot component and a data component, and performing weighted summation on the pilot component and the data component to achieve matched reception of the satellite navigation signal;

filtering the received data component based on a filtering weight vector to obtain a time-domain anti-jamming data component, determining a filtering weight vector recursive formula based on the received data component and the time-domain anti-jamming data component, continuously updating the filtering weight vector of a next batch of data component according to the filtering weight vector recursive formula, and performing anti-jamming on the received data component based on the updated filtering weight vector to obtain an anti-jamming data component;

performing batch filtering on the received pilot component based on a filter weight to obtain a time-domain anti-jamming pilot component, determining a filter weight update formula based on the received pilot component and the time-domain anti-jamming pilot component, and continuously updating a filter weight of a next batch of data based on the filter weight update formula, and performing anti-jamming on the received pilot component based on the updated filter weight to obtain an anti-jamming pilot component, wherein the filter weight is updated once for each batch of data received; and receiving the anti-jamming data component and the anti-jamming pilot component, perform message solving and pseudocode ranging respectively based on the anti-jamming data component and the anti-jamming pilot component to obtain a pseudocode ranging result and solved message information, fusing the pseudocode ranging result and the solved message information to obtain a fusion result, and providing the fusion result including the pseudocode ranging result and the solved message information to a user and allowing utilization of the dual-component characteristic of the navigation signal by the user.

2. The anti-jamming method according to claim 1, further comprising determining a frequency of a matched filter for implementing the matched reception of the satellite navigation signal:

$$h(t) \overset{FFT}{\leftrightarrow} H(\omega) = kS^*(\omega)e^{-j\omega t_0};$$

wherein h(t) denotes an impulse response of the matched filter; H(ω) denotes a frequency response function of the matched filter; k denotes a transfer coefficient; S(ω)

denotes a frequency spectrum of a predetermined component signal; $t_0$ denotes a sampling time; and *, a superscript, denotes conjugation taking.

3. The anti-jamming method according to claim 1, further comprising filtering the received data component based on the filtering weight vector to obtain the time-domain anti-jamming data component:

$$y_{data}(n) = x_{data} \cdot W = \sum_{k=1}^{N} x_{data}(n-k+1) w_k^l;$$

wherein $x_{data}$ denotes the received data component; W denotes the filtering weight vector; N denotes a length of an anti-jamming filter; n denotes data at time n; k denotes a filter coefficient number; $w_k^l$ denotes a k-th filter coefficient for an l-th iteration; and l denotes a weight vector iteration number of the anti-jamming filter.

4. The anti-jamming method according to claim 3, wherein the received data component is:

$$x_{data} = [x_{data}(n), x_{data}(n-1), \ldots, x_{data}(n-N+1)]^T;$$

wherein T, a superscript, denotes a transpose operation.

5. The anti-jamming method according to claim 3, wherein the filtering weight vector is:

$$W^l = [w_1^l, w_2^l, \ldots, w_N^l].$$

6. The anti-jamming method according to claim 3, further comprising determining the filtering weight vector recursive formula based on the received data component and the time-domain anti-jamming data component:

$$\begin{aligned} W^l &= W^{l-1} - \frac{\alpha}{\|x_{data}(n)\|^2 + \beta} e^*(n) x_{data}(n) \\ &= W^{l-1} - \frac{\alpha}{\|x_{data}(n)\|^2 + \beta} [s_{data}(n) - y_{data}(n)]^* x_{data}(n) \\ &= W^{l-1} + \frac{\alpha}{\|x_{data}(n)\|^2 + \beta} y_{data}^*(n) x_{data}(n) \end{aligned}$$

wherein $\alpha$ and $\beta$ denote step size control parameters; denotes an error signal; $s_{data}(n)$ denotes the satellite navigation signal; $y_{data}(n)$ denotes the time-domain anti-jamming data component; and $\|\ \|^2$ denotes an l2 norm.

7. The anti-jamming method according to claim 1, wherein the received pilot component is:

$$x_{pilot}(n) = [x_{pilot}(n), x_{pilot}(n-1), \ldots, x_{pilot}(n-N+1)]^T;$$

wherein N denotes a length of an anti-jamming filter; n denotes data at time n; and T, a superscript, denotes a transpose operation.

8. The anti-jamming method according to claim 1, further comprising filtering the received pilot component based on the filter weight to obtain the time-domain anti-jamming pilot component:

$$y_{pilot}(3k+i) = W^H(k) x_{pilot}(3k+i), \ i = 0,1,2;$$

wherein k denotes a length number of a filter; $(\bullet)^H$ denotes conjugate transpose; and $x_{pilot}$ denotes the received pilot component.

9. The anti-jamming method according to claim 8, further comprising determining the filter weight update formula based on the received pilot component and the time-domain anti-jamming pilot component:

$$W(k) = W(k-1) + \frac{2\mu}{3} \sum_{i=0}^{2} y_{pilot}^*(3(k-1)+i) x_{pilot}(3(k-1)+i);$$

wherein $\mu$ denotes an anti-jamming convergence step size; and *, a superscript, denotes conjugation taking.

* * * * *